United States Patent
Jia et al.

(10) Patent No.: US 11,109,389 B2
(45) Date of Patent: Aug. 31, 2021

(54) METHOD FOR REPORTING NETWORK PERFORMANCE PARAMETER AND DEVICE

(71) Applicant: Huawei Technologies Co., Ltd., Shenzhen (CN)

(72) Inventors: Xiaoqian Jia, Shanghai (CN); Jun Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/786,123

(22) Filed: Feb. 10, 2020

(65) Prior Publication Data
US 2020/0187218 A1   Jun. 11, 2020

Related U.S. Application Data

(63) Continuation of application No. PCT/CN2018/100074, filed on Aug. 10, 2018.

(30) Foreign Application Priority Data

Aug. 11, 2017   (CN) .......................... 201710685419.9

(51) Int. Cl.
*H04W 72/08*   (2009.01)
*H04W 24/10*   (2009.01)

(52) U.S. Cl.
CPC ......... *H04W 72/085* (2013.01); *H04W 24/10* (2013.01)

(58) Field of Classification Search
None
See application file for complete search history.

(56) References Cited

U.S. PATENT DOCUMENTS

| 6,757,681 B1 | 6/2004 | Bertram et al. | |
| 2015/0223113 A1* | 8/2015 | Matsunaga | H04W 52/343 370/236 |
| 2018/0007603 A1* | 1/2018 | Miranda | H04W 36/0085 |

(Continued)

FOREIGN PATENT DOCUMENTS

| CN | 101018160 A | 8/2007 |
| CN | 103763741 A | 4/2014 |

(Continued)

OTHER PUBLICATIONS

Huawei et al., "Discussion on adding use case for PRB usage and IP throughput measurements," 3GPP TSG SA WG5 (Telecom Management) Meeting #112, S5-171963, Guilin, China, Mar. 27-31, 2017, 6 pages.

(Continued)

*Primary Examiner* — Adolf Dsouza
(74) *Attorney, Agent, or Firm* — Slater Matsil, LLP

(57) ABSTRACT

A first network device obtains at least one of sampling information and reporting information, where the sampling information is used to indicate a sampling period, the reporting information is used to indicate a reporting period, the reporting period is N times the sampling period, and N is an integer greater than or equal to 1. The first network device performs sampling in N sampling periods included in the reporting period, to obtain information about N first parameters. The first network device sends the information about the N first parameters to a second network device.

20 Claims, 3 Drawing Sheets

(56) References Cited

U.S. PATENT DOCUMENTS

2018/0115439 A1* 4/2018 Bhatti .............. H04L 25/0208
2018/0176817 A1* 6/2018 Huang .............. H04L 12/6418

FOREIGN PATENT DOCUMENTS

| CN | 103974295 A | 8/2014 |
|---|---|---|
| CN | 104581804 A | 4/2015 |
| EP | 2887726 A1 | 6/2015 |

OTHER PUBLICATIONS

3rd Generation Partnership Project;Technical Specification Group Services and System Aspects; Telecommunication management; Performance Management (PM) Integration Reference Point (IRP): Information Service (IS) (Release 14), 3GPP TS 32.412 V14.0.0 (Dec. 2016), 68 pages.

3rd Generation Partnership Project; Technical Specification Group Services and System Aspects; Telecommunication management; Performance Management (PM); Concept and requirements (Release 14), 3GPP TS 32.401 V14.1.1 (Aug. 2017), 29 pages.

3rd Generation Partnership Project; Technical Specification Group Services and System Aspects; Telecommunication management; Performance Management (PM); Performance measurements Evolved Universal Terrestrial Radio Access Network (E-UTRAN) (Release 14), 3GPP TS 32.425 V14.1.0 (Dec. 2016), 82 pages.

3GPP TSG SA WG5 (3GPP SA5), "LS to RAN2 on adding PRB usage distribution and IP throughput distribution measurements," 3GPP TSG RAN WG2#98, R2-1704027, Hangzhou, China, May 15-19, 2017, 1 page.

3rd Generation Partnership Project; Technical Specification Group Radio Access Network; Evolved Universal Terrestrial Radio Access (E-UTRA); Layer 2—Measurements (Release 14), 3GPP TS 36.314 V14.0.0 (Mar. 2017), 23 pages.

Huawei et al., "Overview on new LTE measurements," 3GPP TSG-RAN WG2 #98, R2-1704967, Hangzhou, China, May 15-19, 2017, 3 pages.

Huawei et al.,"Discussion on adding use case for PRB usage and IP thoughput measurements", 3GPP TSG SA WGS (Telecom Management) Meeting #112 S5-171994, Mar. 27-31, 2017, Guilin (China), 6 pages.

Ericsson, "PRB Usage Distribution and IP Throughput Distribution", 3GPP TSG-RAN WG2 #100 R2-1713461, Reno, NV, USA, Nov. 27-Dec. 1, 2017, 4 pages.

* cited by examiner

METHOD FOR REPORTING NETWORK PERFORMANCE PARAMETER AND DEVICE

CROSS-REFERENCE TO RELATED APPLICATIONS

This application is a continuation of International Application No. PCT/CN2018/100074, filed on Aug. 10, 2018, which claims priority to Chinese Patent Application No. 201710685419.9, filed on Aug. 11, 2017. The disclosures of the aforementioned applications are hereby incorporated by reference in their entireties.

TECHNICAL FIELD

This application relates to the field of communications technologies, and in particular, to a method for reporting a network performance parameter and a device.

BACKGROUND

A network management network element can create a network performance parameter-related measurement task and deliver the task to a base station. The base station reports a parameter used to represent network performance to the network management network element based on a configuration requirement in the measurement task. The network management network element monitors and evaluates a network based on the parameter reported by the base station. The parameter used to represent network performance may include physical resource block usage (PRB Usage), an air interface transmission rate, and the like. The physical resource block usage is an indicator for measuring an air interface resource of the base station, and a value of the air interface transmission rate directly affects user experience.

Because a long term evolution (LTE) network is a self-interference system, if the PRB usage is excessively high, spectral efficiency is reduced, and operator traffic growth is reduced. Therefore, the network management network element can monitor PRB usage of each cell, to help an operator and an equipment vendor discover problems of limited network resources and excessively high user load in time.

The air interface transmission rate changes with a position of a terminal and fluctuation of channel quality. The network management network element may monitor an air interface transmission rate of each terminal, to avoid poor user experience caused by an excessively low air interface transmission rate.

In the prior art, the measurement task about the PRB usage and the air interface transmission rate that is established by the network management network element usually requires that the base station reports an average value of the PRB usage and an average value of the air interface transmission rate in one reporting period based on a reporting period at a minute or hour level (for example, 5 minutes, 15 minutes, 30 minutes, or 1 hour). However, in many scenarios, short-time service burst or channel quality fluctuation may appear. Consequently, the PRB usage is relatively high within a short time and resources are limited, or the air interface transmission rate is relatively low. However, the average value reported by the base station cannot reflect the short-time burst. This is adverse to network performance evaluation performed by the network management network element.

SUMMARY

This application provides a method for reporting a network performance parameter and a device, to implement that a network performance parameter reported by a network device can reflect wholeness and burstiness of network performance in a corresponding time period.

According to a first aspect, this application provides a method for reporting a network performance parameter, including: obtaining, by a first network device, sampling information, reporting information, and information about at least one preset parameter value interval, where the sampling information is used to indicate a sampling period, the reporting information is used to indicate a reporting period, the reporting period is N times the sampling period, N is an integer greater than or equal to 1, and the information about the at least one parameter value interval is used to indicate a parameter value range corresponding to each parameter value interval; performing, by the first network device, sampling in N sampling periods, to obtain information about N first parameters; determining, by the first network device, distribution status information of the N first parameters in the at least one parameter value interval; and sending, by the first network device, the distribution status information to a second network device.

In the foregoing method, interval division is performed on a value range of the first parameter in advance, and the first network device performs sampling based on the preset sampling periods, and reports, to the second network device, a distribution status of the N first parameters in the preset interval that are obtained in the N sampling periods, so that the second network device evaluates network performance based on the distribution status. Compared with a reported average value in the prior art, the distribution status of the first parameters in the preset interval can better reflect wholeness and burstiness of the network performance in the N sampling periods. This helps the second network device obtain a more accurate network performance evaluation result when performing network performance evaluation based on the distribution status.

In a possible implementation, at least one of the sampling information, the reporting information, and the information about the at least one parameter value interval is sent by the second network device to the first network device. In a specific embodiment, the first network device may receive a measurement task sent by the second network device. The measurement task may include the information about the first parameter, the sampling period, the reporting period, and the information about the parameter value interval. The first network device performs sampling and reporting on the first parameter based on the measurement task.

In the foregoing method, because various types of information may be sent by the second network device to the first network device, the second network device may indicate different sampling periods, reporting periods, or parameter interval information based on a network environment change.

In a possible implementation, at least one of the sampling information and the information about the at least one parameter value interval is preset information. In a specific embodiment, the first network device performs sampling and reporting on the first parameter based on the sampling information and the information about the at least one parameter value interval that are pre-stored in a memory.

In the foregoing method, the various types of information may be preset, so that the various types of information do not need to be notified by another device, and signaling overheads are reduced.

In a possible implementation, the determining, by the first network device, distribution status information of the N first parameters in the at least one parameter value interval includes: determining that a quantity of first parameters that are in the N first parameters and that are corresponding to each parameter value interval is obtained.

The first network device reports, to the second network device, the determined quantity of first parameters corresponding to each parameter value interval. Compared with the prior art in which only an average value is reported to the second network device, this helps the second network device more comprehensively learn of a network performance status in the N sampling periods, and burst conditions that occur in a time period corresponding to the N sampling periods can still be reflected although the average value is calculated.

In a possible implementation, the determining, by the first network device, distribution status information of the N first parameters in the at least one parameter value interval includes: determining a quantity of first parameters that are in the N first parameters and that are corresponding to each parameter value interval; and determining a ratio of the quantity of first parameters corresponding to each parameter value interval to N.

The first network device reports, to the second network device, the determined ratio of the quantity of first parameters corresponding to each parameter value interval to N. Compared with the prior art in which only an average value is reported to the second network device, this helps the second network device more comprehensively learn of a network performance status in the N sampling periods, and burst conditions that occur in a time period corresponding to the N sampling periods can still be reflected although the average value is calculated.

In a possible implementation, the first parameter includes at least one of physical resource block usage and an air interface transmission rate.

In a possible implementation, the sampling period includes k sampling sub-periods, and k is an integer greater than or equal to 1; and the performing, by the first network device, sampling in N sampling periods, to obtain information about N first parameters includes: performing, by the first network device, sampling in each sampling sub-period in a first sampling period, to obtain a quantity of physical resource blocks that are used for transmission and that are corresponding to each sampling sub-period, where the first sampling period is any one of the N sampling periods; and determining, by the first network device, physical resource block usage corresponding to the first sampling period according to a formula below:

$$M = \left\lfloor \frac{M1}{P} * 100 \right\rfloor$$

where M indicates the physical resource block usage corresponding to the first sampling period, M1 indicates a quantity of physical resource blocks used for transmission, and P indicates a quantity of physical resource blocks that can be used for transmission.

In a possible implementation, the performing, by the first network device, sampling in N sampling periods, to obtain information about N first parameters includes: obtaining, by the first network device in a first sampling period, a data volume of each transmitted data packet and transmission duration of each data packet, where the first sampling period is any one of the N sampling periods; and determining, by the first network device, an air interface transmission rate corresponding to the first sampling period according to a formula below:

$$IPthroughput = \frac{\sum_{i=1}^{L} ThpVolDl(i)}{\sum_{i=0}^{L} ThpTimeDl(i)}$$

where Ipthroughput indicates the air interface transmission rate, L indicates that L data packets are transmitted in the first sampling period, ThpVolDl(i) indicates a data volume of an $i^{th}$ transmitted data packet, ThpTimeDl(i) indicates transmission duration of the $i^{th}$ transmitted data packet, and i is an integer greater than or equal to 1 and less than or equal to L.

According to a second aspect, this application provides a method for reporting a network performance parameter, including: obtaining, by a first network device, at least one of sampling information and reporting information, where the sampling information is used to indicate a sampling period, the reporting information is used to indicate a reporting period, the reporting period is N times the sampling period, and N is an integer greater than or equal to 1; performing, by the first network device, sampling in N sampling periods included in the reporting period, to obtain information about N first parameters, where N is an integer greater than or equal to 1; and sending, by the first network device, the information about the N first parameters to a second network device.

In the foregoing method, the first network device performs sampling in the N sampling periods in one reporting period to obtain the information about the N first parameters, and reports the information about the N first parameters to the second network device, so that the second network device evaluates network performance based on the information about the N first parameters. Compared with a reported average value in the prior art, this can better reflect wholeness and burstiness of the network performance in the N sampling periods, to help the second network device obtain a more accurate network performance evaluation result when performing network performance evaluation.

In a possible implementation, at least one of the sampling information and the reporting information is sent by the second network device to the first network device. In a specific embodiment, the first network device may receive a measurement task sent by the second network device. The measurement task may include the information about the first parameter, the sampling information, and the reporting information. The first network device performs sampling and reporting on the first parameter based on the measurement task.

In a possible implementation, at least one of the sampling information and the reporting information is preset information. In a specific embodiment, the first network device performs sampling and reporting on the first parameter based on the sampling information and the reporting information that are pre-stored in a memory.

According to a third aspect, this application provides a network device. The network device may be used as a first network device and includes: a processor, and a memory and a transmitter that are separately connected to the processor, where the processor is configured to invoke a computer program pre-stored in the memory to: obtain at least one of sampling information, reporting information, and information about at least one preset parameter value interval, where the sampling information is used to indicate a sampling period, the reporting information is used to indicate a reporting period, the reporting period is N times the sampling period, N is an integer greater than or equal to 1, and the information about the parameter value interval is used to indicate a parameter value range corresponding to each parameter value interval; perform sampling in N sampling periods, to obtain information about N first parameters; and determine distribution status information of the N first parameters in the at least one parameter value interval; and the transmitter is configured to send the distribution status information to a second network device.

In a possible implementation, at least one of the sampling information, the reporting information, and the information about the at least one parameter value interval is sent by the second network device to the first network device.

In a possible implementation, at least one of the sampling information and the information about the at least one parameter value interval is preset information.

In a possible implementation, when determining a distribution status of the N first parameters in the at least one parameter value interval, the processor is specifically configured to: determine that a quantity of first parameters that are in the N first parameters and that are corresponding to each parameter value interval is obtained.

In a possible implementation, when determining a distribution status of the N first parameters in the at least one parameter value interval, the processor is specifically configured to: determine that a quantity of first parameters that are in the N first parameters and that are corresponding to each parameter value interval is obtained; and determine a ratio of the quantity of first parameters corresponding to each parameter value interval to N.

In a possible implementation, the information about the first parameter includes at least one of physical resource block usage and an air interface transmission rate.

In a possible implementation, when performing sampling in the N sampling periods, to obtain the information about the N first parameters, the processor is specifically configured to: perform sampling in each sampling sub-period in a first sampling period, to obtain a quantity of physical resource blocks that are used for transmission and that are corresponding to each sampling sub-period, where the first sampling period is any one of the N sampling periods; and determine physical resource block usage corresponding to the first sampling period according to a formula below:

$$M = \left\lfloor \frac{M1}{P} * 100 \right\rfloor$$

where M indicates the physical resource block usage corresponding to the first sampling period, M1 indicates a quantity of physical resource blocks used for transmission, and P indicates a quantity of physical resource blocks that can be used for transmission.

In a possible implementation, when performing sampling in the N sampling periods, to obtain the information about the N first parameters, the processor is specifically configured to: obtain, in a first sampling period, a data volume of each transmitted data packet and transmission duration of each data packet, where the first sampling period is any one of the N sampling periods; and determine an air interface transmission rate corresponding to the first sampling period according to a formula below:

$$IPthroughput = \frac{\sum_{i=1}^{L} ThpVolDl(i)}{\sum_{i=0}^{L} ThpTimeDl(i)}$$

where Ipthroughput indicates the air interface transmission rate, L indicates that L data packets are transmitted in the first sampling period, ThpVolDl(i) indicates a data volume of an $i^{th}$ transmitted data packet, ThpTimeDl(i) indicates transmission duration of the $i^{th}$ data packet, and i is an integer greater than or equal to 1 and less than or equal to L.

According to a fourth aspect, this application provides a network device. The network device may be used as a first network device and includes: a processor, and a memory and a transmitter that are separately connected to the processor, where the processor is configured to invoke a computer program pre-stored in the memory to: obtain at least one of sampling information and reporting information, where the sampling information is used to indicate a sampling period, the reporting information is used to indicate a reporting period, the reporting period is N times the sampling period, and N is an integer greater than or equal to 1; and perform sampling in N sampling periods included in the reporting period, to obtain information about N first parameters, where N is an integer greater than or equal 1; and the transmitter is configured to send the information about the N first parameters to a second network device.

In a possible implementation, at least one of the sampling information and the reporting information is sent by the second network device to the first network device. In a specific embodiment, the first network device may receive a measurement task sent by the second network device. The measurement task may include the information about the first parameter, the sampling information, and the reporting information. The first network device performs sampling and reporting on the first parameter based on the measurement task.

In a possible implementation, at least one of the sampling information and the reporting information is preset information. In a specific embodiment, the first network device performs sampling and reporting on the first parameter based on the sampling information and the reporting information that are pre-stored in the memory.

According to a fifth aspect, this application provides a computer-readable storage medium. The computer-readable storage medium stores a computer instruction. When the instruction is run on a computer, the computer is enabled to perform the method according to the first aspect or the second aspect.

According to a sixth aspect, this application provides a network device, and the network device may be configured to perform the method according to the first aspect.

In a possible implementation, the network device may include an obtaining module, a sampling module, a determining module, and a sending module, where the obtaining module is configured to obtain at least one of sampling information, reporting information, and information about at least one preset parameter value interval, where the sampling information is used to indicate a sampling period, the reporting information is used to indicate a reporting period, the reporting period is N times the sampling period, N is an integer greater than or equal to 1, and the information about the parameter value interval is used to indicate a parameter value range corresponding to each parameter value interval; the sampling module is configured to perform sampling in N sampling periods, to obtain information about N first parameters; the determining module is configured to determine distribution status information of the N first parameters in the at least one parameter value interval; and the sending module is configured to send the distribution status information to a second network device.

DETAILED DESCRIPTION OF ILLUSTRATIVE EMBODIMENTS

To make the objectives, technical solutions, and advantages of this application clearer, the following further describes this application in detail with reference to the accompanying drawings.

An operation support system (OSS) can create a measurement task and deliver the measurement task to a base station, and the base station measures a measurement counter configured in the measurement task and reports a measurement result to the OSS.

For example, when the measurement counter configured in the measurement task is physical resource block usage, the base station obtains an average value of physical resource block usage in a period T, and reports the average value to the OSS. The OSS evaluates network performance based on the average value reported by the base station.

However, in an actual application, the period T is usually 5 minutes, 15 minutes, 30 minutes, or even longer. Therefore, the average value of the physical resource block usage in the period T can indicate an overall situation of the physical resource block usage in the period T, but cannot reflect a short-time burst condition because, for example, although the physical resource block usage suddenly increases to a relatively large value due to simultaneous communication between a relatively large quantity of terminals and the base station, overall physical resource block usage at other moments in the period T is relatively low.

For another example, when the measurement counter configured in the measurement task is an air interface transmission rate, a similar problem also exists.

Because a measurement parameter reported by the base station can only reflect wholeness of the network performance, and cannot reflect burst conditions. Therefore, when the OSS evaluates the network performance based on the measurement parameter reported by the base station, an inaccurate evaluation result may exist, and further, a network cannot be effectively regulated and controlled.

To resolve the foregoing problem, this application provides a method for reporting a network performance parameter, to implement that a reported network performance parameter can not only reflect wholeness of network performance in a corresponding time period, but also reflect burstiness of the network performance.

In the embodiments of this application, a first network device represents a device configured to report a network performance parameter, for example, a base station. A second network device represents a device configured to receive a network performance parameter, for example, a network management device such as an OSS.

Figure 1:
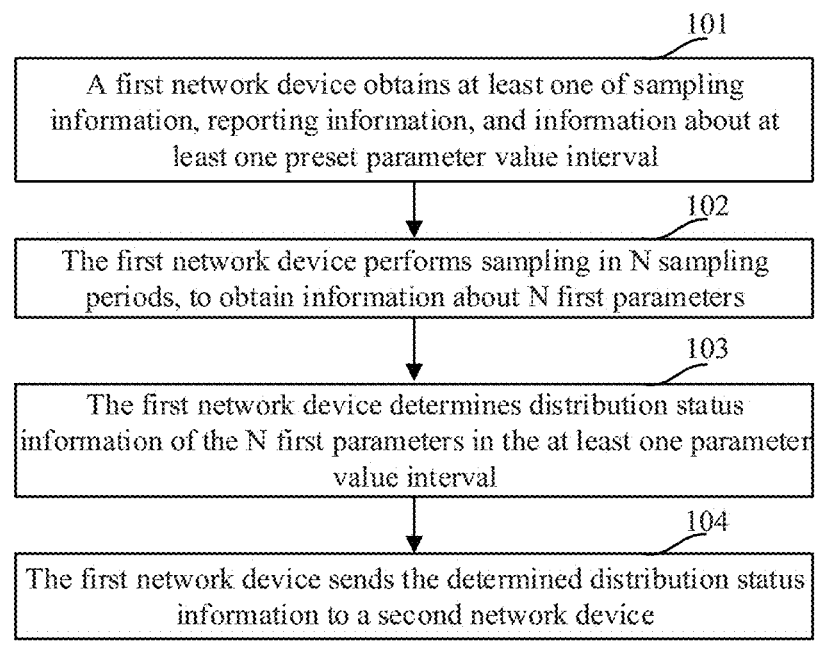
FIG. 1 is a schematic flowchart of a method for reporting a network performance parameter according to this application.

FIG. 1 is a schematic flowchart of a method for reporting a network performance parameter according to this application. As shown in the figure, the method may include the following steps.

Step 101. A first network device obtains sampling information, reporting information, and information about at least one preset parameter value interval.

The sampling information may be information used to indicate a sampling period. Specifically, the sampling information may be a sampling period. Alternatively, because a given mathematical relationship exists between a sampling period and a sampling frequency, the sampling information may alternatively be a sampling frequency. The first network device performs sampling based on the sampling period.

The reporting information may be information used to indicate a reporting period, the reporting period is usually N times the sampling period, and N is an integer greater than or equal to 1. Specifically, the reporting information may be a reporting period, or may be a reporting frequency, or may be a value of N. The first network device may determine the reporting period based on the sampling period and the value of N. The first network device reports collected information about a first parameter or processed information about a first parameter to a second network device based on the reporting period.

For example, if the sampling information indicates that the sampling period is one second and the reporting information indicates that the reporting period is five minutes, the value of N is 300. The first network device obtains information about one first parameter every one second, processes obtained information about 300 first parameters every five minutes, and reports a processing result to the second network device.

The information about the at least one preset parameter value interval is used to indicate a parameter value range corresponding to each parameter value interval.

Figure 2:
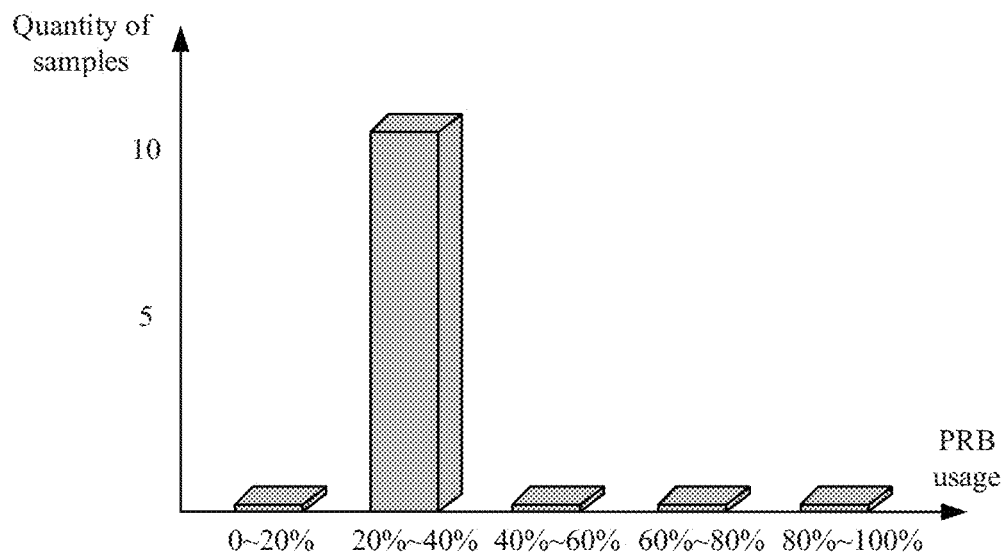
FIG. 2 is a schematic diagram of parameter value interval division of physical resource block usage according to this application.

In a specific embodiment, if a width of each parameter value interval is the same, the information about the parameter value interval may be a width of each parameter value interval. For example, if the first parameter is physical resource block usage, preset parameter value intervals are respectively [0%, 20%], (20%, 40%], (40%, 60%], (60%, 80%], and (81%, 100%], as shown in FIG. 2. Because a width of each interval is 20%, the information about the parameter value interval may be 20%. Therefore, the first network device may equally divide a value range of the physical resource block usage into intervals each having a width of 20%, to obtain a range of each parameter value interval.

Figure 3:
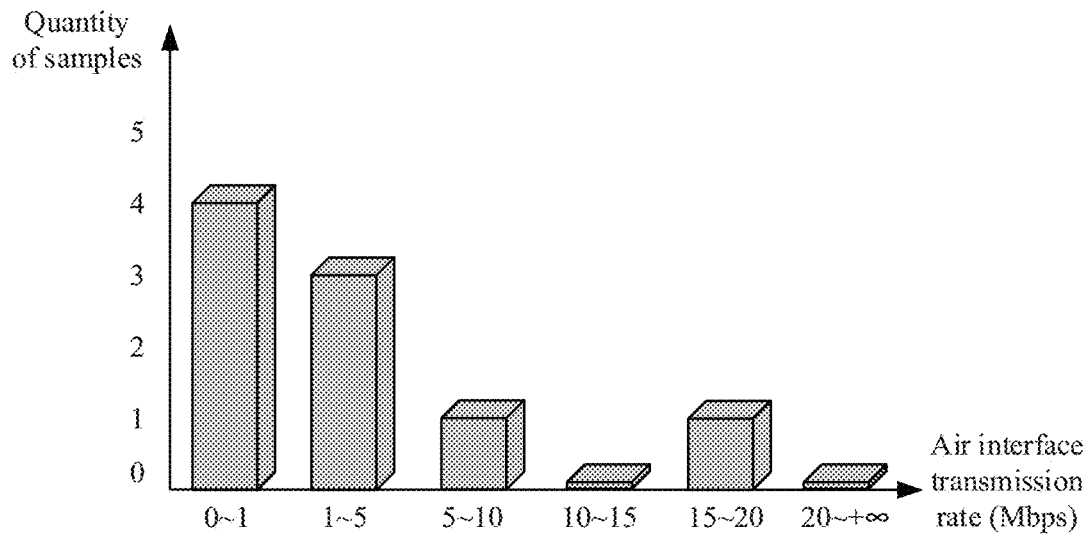
FIG. 3 is a schematic diagram of parameter value interval division of an air interface transmission rate according to this application.

In some other embodiments, the information about the parameter value interval may alternatively be a value range of each interval. For example, when widths of a plurality of parameter value intervals are different, the information about the parameter value interval may include the value range of each interval. In a specific example, the first parameter is an air interface transmission rate. Because the actual transmission rate is mostly centralized between 0 Mbps and 1 Mbps, divided parameter value intervals may respectively be [0, 1], (1, 5], (5, 10], (10, 15], (15, 20], and (20, +∞] (Unit: Mbps), as shown in FIG. 3.

If a quantity of divided parameter value intervals is relatively large, distribution and a change of a parameter value can be reflected more accurately. However, because the quantity of parameter value intervals is relatively large, statistics collected by the first network device are increased, and reported content information is also correspondingly increased. If a quantity of divided parameter value intervals is relatively small, statistics collected by the first network device are reduced, and reported content information is also correspondingly reduced, but it is possible that wholeness and burstiness of the parameter value in a period T cannot be accurately reflected. Therefore, when the parameter value intervals are divided, refer to collected value ranges of a plurality of first parameters and a value range of a first parameter when network performance is relatively good or relatively poor.

For example, if the first parameter is physical resource block usage, a value range of the first parameter is [0, 100%], and the value range of the first parameter may be equally divided into several intervals. For example, five equally-divided parameter value intervals are respectively [0%, 20%], (20%, 40%], (40%, 60%], (60%, 80%], and (81%, 100%]. Alternatively, interval division may be performed with reference to a correspondence between a value of the first parameter and network performance. For example, divided parameter value intervals are respectively [0%, 20%], (20%, 70%], and (70%, 100%], where if the value of the first parameter falls within the interval (70%, 100%], it indicates that the physical resource block usage is relatively high and network load is relatively large. If the value of the first parameter falls within the interval (20%, 70%], it indicates that the physical resource block usage is relatively moderate and network load is moderate. If the value of the first parameter falls within the interval [0%, 20%], it indicates that the physical resource block usage is relatively low and a large quantity of physical resources are idle.

It should be understood that the quantity of parameter value intervals and the value range of each parameter value interval are both examples for description. This is not limited in this application.

In a possible implementation, at least one of the sampling information, the reporting information, and the information about the at least one parameter value interval is preset information. A memory of the first network device may pre-store one or more of the sampling information, the reporting information, and the information about the at least one parameter value interval. For example, in a future communications protocol, the sampling period, the reporting period, and the information about the at least one preset parameter value interval may be limited. Therefore, the memory of the first network device pre-stores the sampling period, the reporting period, and the information about the at least one preset parameter value interval, so that the first network device may read the sampling period, the reporting period, and the information about the at least one preset parameter value interval from the memory.

In another possible implementation, at least one of the sampling information, the reporting period, and the information about the at least one preset parameter value interval is sent by the second network device to the first network device. For example, when creating a measurement task, the second network device may determine, based on an actual requirement, a sampling period of the first network device, the reporting period of the first network device, and how to divide a parameter value interval of the first parameter, add the information to the measurement task, and deliver the measurement task to the first network device. The first network device determines the sampling period and the information about the parameter value interval based on the measurement task delivered by the second network device.

Optionally, the foregoing two implementations may alternatively be combined. To be specific, a default value is pre-agreed for the sampling information, the reporting information, or the information about the at least one preset parameter value interval. If the second network device sends the sampling information, the reporting information, or the information about the parameter value interval to the first network device, the first network device determines the sampling period, the reporting period, and a range of each parameter value interval based on the sampling information, the reporting information, or the information about the parameter value interval that is sent by the second network device. If the second network device does not send the sampling information, the reporting information, or the information about the parameter value interval to the first network device, the first network device determines the sampling period, the reporting period, and a range of each parameter value interval based on the pre-agreed default value.

Step 102. The first network device performs sampling in N sampling periods, to obtain information about N first parameters.

In a possible implementation, when performing sampling in each sampling period, the first network device may perform sampling at a specific moment in the period, and determine information about a first parameter in the sampling period based on a parameter obtained through sampling at the moment.

Specifically, physical resource block usage corresponding to the sampling period may be obtained through calculation according to a formula (1):

$$M = \left\lfloor \frac{M1}{P} * 100 \right\rfloor \quad (1)$$

where M indicates uplink (or downlink, or uplink and downlink) physical resource block usage in a sampling period, M1 indicates a quantity of physical resource blocks used in uplink transmission (or downlink transmission, or uplink transmission and downlink transmission), P indicates a quantity of all physical resource blocks that can be used for uplink transmission (or downlink transmission, or uplink transmission and downlink transmission).

For ease of statistics collection, the formula (i) uses an algorithm of rounding down to the nearest integer. It should be understood that rounding down to the nearest integer in the formula (i) may alternatively be changed to rounding up to the nearest integer.

For another example, in a sampling period, L data packets are transmitted in total, where L is an integer greater than or equal to 1. The first network device obtains a data volume ThpVolDl(i) of each data packet and transmission duration ThpTimeDl(i) of each data packet, and then determines an air interface transmission rate Ipthroughput in the period according to a formula below:

$$IPthroughput = \frac{\sum_{i=1}^{L} ThpVolDl(i)}{\sum_{i=0}^{L} ThpTimeDl(i)} \quad (2)$$

where i is an integer greater than or equal to 1 and less than or equal to L.

Usually, a unit of the data volume of each data packet is kilobits (kbits), and a unit of the transmission duration of each data packet is ms. The air interface transmission rate may be multiplied by 1000 according to the formula (2), to convert a unit of the air interface transmission rate to kbits/s, conforming to an application habit.

In addition, the unit of the transmission duration of each data packet is usually ms, that is, a time transmission interval (TTI), and when transmission duration of a data packet is calculated, the transmission duration may be obtained by subtracting a transmission start time from a transmission end time. Therefore, if transmission of a relatively small data packet is completed in a TTI, a time obtained by subtracting a transmission start time from a transmission end time is 0. If transmission of each data packet in a sampling period is completed in a TTI, that is, if a value of the denominator in the formula (2) is 0, it is considered that the air interface transmission rate in the sampling period is 0.

In another possible implementation, the first network device may alternatively perform a plurality of times of sampling in the sampling period, and determine information about the first parameter in the period based on sampling results of the plurality of times of sampling. For example, the sampling period is further divided into k sampling sub-periods, and the first network device performs sampling in the k sampling sub-periods, and obtains physical resource block usage of each sampling sub-period according to the formula (1), or obtains an air interface transmission rate of each sampling sub-period according to the formula (2). Then the first network device calculates an average value of physical resource block usage or air interface transmission rates of the k sub-periods, to obtain physical resource block usage or an air interface transmission rate in the sampling period.

Step 103. The first network device determines distribution status information of the N first parameters in the at least one parameter value interval.

In a possible implementation, for the at least one parameter value interval, the first network device determines a quantity of first parameters that are in the N first parameters and that are corresponding to each parameter value interval is obtained.

Still use an example in which the first parameter is physical resource block usage and the parameter value intervals are respectively [0%, 20%], (20%, 40%], (40%, 60%], (60%, 80%], and (81%, 100%], the first network device determines, for each interval, a quantity of first parameters corresponding to the interval, and quantities of first parameters respectively corresponding to the five parameter value intervals above are $n_1$, $n_2$, $n_3$, $n_4$, and $n_5$, where $n_1$, $n_2$, $n_3$, $n_4$, and $n_5$ are integers greater than or equal to 0, and $n_1+n_2+n_3+n_4+n_5=N$. Details may be shown in FIG. 2.

In another possible implementation, the first network device determines, for each parameter value interval, a quantity of first parameters that are in the N first parameters and that are corresponding to each parameter value interval, and further determines a ratio of the quantity of first parameters corresponding to each parameter value interval to N.

Still use an example in which the first parameter is physical resource block usage and the parameter value intervals are respectively [0%, 20%], (20%, 40%], (40%, 60%], (60%, 80%], and (81%, 100%], the first network device determines, for each interval, a quantity of first parameters corresponding to the interval, and quantities of first parameters respectively corresponding to the five parameter value intervals above are $n_1$, $n_2$, $n_3$, $n_4$, and $n_5$, where $n_1$, $n_2$, $n_3$, $n_4$, and $n_5$ are integers greater than or equal to 0, and $n_1+n_2+n_3+n_4+n_5=N$. Then, the first network device further determines a ratio of $n_1$ to N, a ratio of $n_2$ to N, a ratio of $n_3$ to N, a ratio of $n_4$ to N, and a ratio of $n_5$ to N.

Step 104. The first network device sends the determined distribution status information to the second network device.

As described above, if the distribution status information determined by the first network device is the quantity of first parameters corresponding to each parameter value interval, the first network device reports, to the second network device, the quantity of first parameters corresponding to each parameter value interval. For example, the first network device may send [$n_1$, $n_2$, $n_3$, $n_4$, $n_5$] to the second network device.

For example, assuming that the reporting period is five minutes and the sampling period is one second, N=300, that is, a maximum quantity of first parameters corresponding to each parameter value interval is 300, and may be represented by using nine bits. If a total of five parameter value intervals are divided as mentioned above, distribution status information reported by the first network device in a reporting period may be represented by using 45 bits, so that signaling overheads and resource overheads are not high.

If the distribution status information determined by the first network device is the ratio of the quantity of first parameters corresponding to each parameter value interval to N, the first network device reports, to the second network device, the ratio of the quantity of first parameters corresponding to each parameter value interval to N. For example, the first network device may send [$n_1$/N, $n_2$/N, $n_3$/N, $n_4$/N, $n_5$/N] to the second network device.

Compared with the prior art in which only an average value is reported to the second network device, the quantity of first parameters corresponding to each parameter value interval is reported to the second network device, or the ratio of the quantity of first parameters corresponding to each parameter value interval to N is reported to the second network device. This helps the second network device more comprehensively learn of a network performance status in the N sampling periods, and burst conditions that occur in a time period corresponding to the N sampling periods can still be reflected although the average value is calculated.

After receiving the distribution status information sent by the first network device, the second network device may analyze an overall network performance status in the N sampling periods, for example, analyze a parameter value interval in which a largest quantity of first parameters in the N sampling periods are distributed; or analyze a burst condition in the N sampling periods, for example, analyze a quantity of first parameters corresponding to a parameter value interval with a relatively large or relatively small value.

In the foregoing method, interval division is performed on a value range of the first parameter in advance, and the first network device performs sampling based on the preset sampling period, and reports, to the second network device, distribution status information of the N sampling periods in the preset information, so that the second network device evaluates network performance based on the distribution status information. Compared with a reported average value in the prior art, the distribution status information of the first parameters in the preset interval can better reflect wholeness and burstiness of the network performance in the N sampling periods. This helps the second network device obtain a more accurate network performance evaluation result when performing network performance evaluation based on the distribution status information.

In addition, to resolve the foregoing technical problem, this application further provides a method for reporting a network performance parameter, to implement that a reported network performance parameter can not only reflect wholeness of network performance in a corresponding time period, but also reflect burstiness of the network performance.

Figure 4:
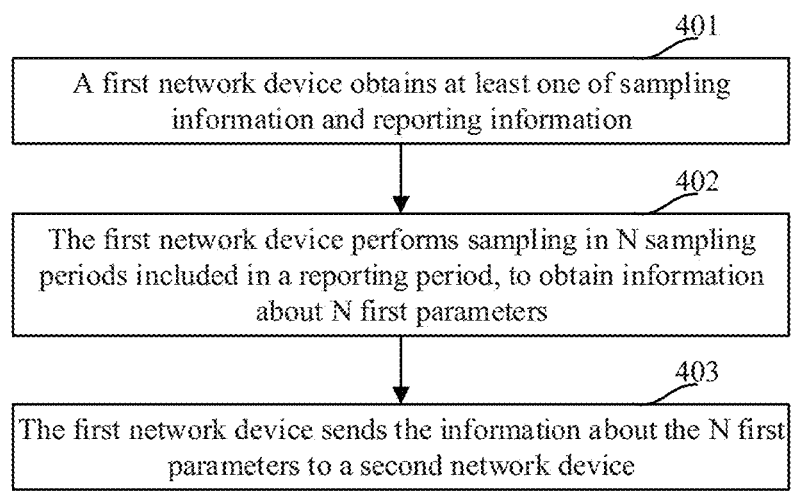
FIG. 4 is a schematic flowchart of another method for reporting a network performance parameter according to this application.

FIG. 4 is a schematic flowchart of a method for reporting a network performance parameter according to this application. As shown in the figure, the method may include the following steps.

Step 401. A first network device obtains at least one of sampling information and reporting information.

The sampling information is used to indicate a sampling period, the reporting information is used to indicate a reporting period, the reporting period is N times the sampling period, and N is an integer greater than or equal to 1. In a specific embodiment, the reporting information may alternatively be a value of N, and the first network device may further determine the reporting period based on the sampling period and the value of N.

In a possible implementation, at least one of the sampling information and the reporting information is preset information. For example, in a future communications protocol, the sampling period and the reporting period may be limited. Therefore, a memory of the first network device may pre-store the sampling period and the reporting period, and the first network device may read the sampling period and the reporting period from the memory.

In another possible implementation, at least one of the sampling information and the reporting information is sent by a second network device to the first network device. For example, when creating a measurement task, the second network device may determine the sampling period and the reporting period of the first network device based on an actual requirement, add the information to the measurement task, and deliver the measurement task to the first network device. The first network device determines the sampling period and the reporting period based on the measurement task delivered by the second network device.

Optionally, the foregoing two implementations may alternatively be combined. To be specific, the memory of the first network device pre-stores default values of the sampling information and the reporting information. If the second network device sends the sampling information or the reporting information to the first network device, the first network device determines the sampling period, the reporting period, and a range of each parameter value interval based on the sampling information or the reporting information sent by the second network device. If the second network device does not send the sampling information and the reporting information to the first network device, the first network device determines the sampling period and the reporting period based on the pre-stored default values.

Step 402. The first network device performs sampling in N sampling periods included in the reporting period, to obtain information about N first parameters.

In a possible implementation, when performing sampling in each sampling period, the first network device may perform sampling at a specific moment in the period, and determine a piece of information about the first parameter in the sampling period based on a parameter obtained through sampling at the moment.

In another possible implementation, the first network device may alternatively perform a plurality of times of sampling in the sampling period, and determine the information about the first parameter in the sampling period based on sampling results of the plurality of times of sampling.

A specific implementation is similar to the implementation in step 102, and details are not described herein again.

Step 403. The first network device sends the information about the N first parameters to the second network device.

After receiving the information about the N first parameters that is sent by the first network device, the second network device may analyze an overall network performance status in the N sampling periods. For example, the second network device may count an average value of the N first parameters. Alternatively, the second network device may analyze a burst condition in the N sampling periods. For example, the second network device may count a quantity and distribution of parameters with a relatively large or relatively small value in the N first parameters.

In the foregoing method, the first network device performs sampling in N sampling periods in a reporting period to obtain information about N first parameters, and reports the information about the N first parameters to the second network device, so that the second network device evaluates network performance based on the N first parameters. Compared with a reported average value in the prior art, this can better reflect wholeness and burstiness of the network performance in the N sampling periods. The second network device may obtain more information about the network performance, so that the second network device can obtain a more accurate network performance evaluation result when performing network performance evaluation.

Figure 5:
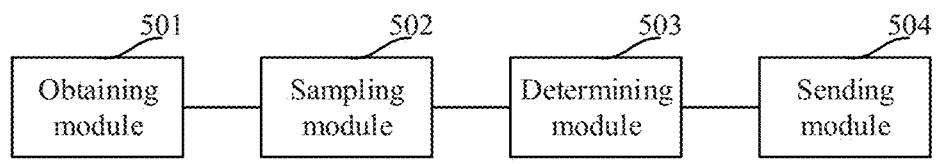
FIG. 5 is a first schematic structural diagram of a network device according to this application.

Based on a same technical concept, an embodiment of this application further provides a network device. The network device may be configured to implement the steps performed by the first network device in the foregoing method embodiment. FIG. 5 is a schematic structural diagram of a network device according to an embodiment of this application. As shown in the figure, the network device includes: an obtaining module 501, a sampling module 502, a determining module 503, and a sending module 504.

Specifically, the obtaining module 501 is configured to obtain at least one of sampling information, reporting information, and information about at least one preset parameter value interval, where the sampling information is used to indicate a sampling period, the reporting information is used to indicate a reporting period, the reporting period is N times the sampling period, N is an integer greater than or equal to 1, and the information about the parameter value interval is used to indicate a parameter value range corresponding to each parameter value interval.

The sampling module 502 is configured to perform sampling in N sampling periods, to obtain information about N first parameters.

The determining module 503 is configured to determine distribution status information of the N first parameters in the at least one parameter value interval.

The sending module 504 is configured to send the distribution status information to a second network device.

In a possible implementation, at least one of the sampling information, the reporting information, and the information about the at least one parameter value interval is sent by the second network device to the first network device.

In a possible implementation, at least one of the sampling information and the information about the at least one parameter value interval is preset information.

In a possible implementation, when determining a distribution status of the N first parameters in the at least one parameter value interval, the determining module 503 is specifically configured to: determine that a quantity of first parameters that are in the N first parameters and that are corresponding to each parameter value interval is obtained.

In a possible implementation, when determining a distribution status of the N first parameters in the at least one parameter value interval, the determining module 503 is specifically configured to: determine that a quantity of first parameters that are in the N first parameters and that are corresponding to each parameter value interval is obtained; and determine a ratio of the quantity of the first parameters corresponding to each parameter value interval to N.

In a possible implementation, the information about the first parameter includes at least one of physical resource block usage and an air interface transmission rate.

In a possible implementation, when performing sampling in the N sampling periods, to obtain the information about the N first parameters, the sampling module 502 is specifically configured to: perform sampling in each sampling sub-period in a first sampling period, to obtain a quantity of physical resource blocks that are used for transmission and that are corresponding to each sampling sub-period, where the first sampling period is any one of the N sampling periods; and determine physical resource block usage corresponding to the first sampling period according to the formula (1) above.

In a possible implementation, when performing sampling in the N sampling periods, to obtain the information about the N first parameters, the sampling module 502 is specifically configured to: obtain, in a first sampling period, a data volume of each transmitted data packet and transmission duration of each data packet, where the first sampling period is any one of the N sampling periods; and determine an air interface transmission rate corresponding to the first sampling period according to the formula (2) above.

Figure 6:
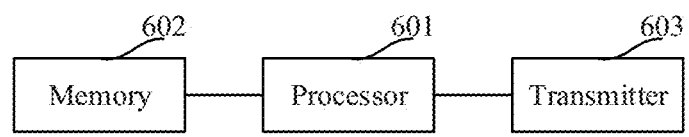
FIG. 6 is a second schematic structural diagram of a network device according to this application.

Based on a same technical concept, an embodiment of this application further provides a network device. The network device may be configured to implement the steps performed by the first network device in the foregoing method embodiment. FIG. 6 is a schematic structural diagram of a network device according to an embodiment of this application. As shown in the figure, the network device includes: a processor 601, and a memory 602 and a transmitter 603 that are separately connected to the processor 601.

The processor 601 is configured to invoke a computer program pre-stored in the memory 602 to: obtain at least one of sampling information, reporting information, and information about at least one preset parameter value interval, where the sampling information is used to indicate a sampling period, the reporting information is used to indicate a reporting period, the reporting period is N times the sampling period, N is an integer greater than or equal to 1, and the information about the parameter value interval is used to indicate a parameter value range corresponding to each parameter value interval; perform sampling in N sampling periods, to obtain information about N first parameters; and determine distribution status information of the N first parameters in the at least one parameter value interval; and the transmitter 603 is configured to send the distribution status information to a second network device.

In a possible implementation, at least one of the sampling information, the reporting information, and the information about the at least one parameter value interval is sent by the second network device to the first network device.

In a possible implementation, at least one of the sampling information and the information about the at least one parameter value interval is preset information.

In a possible implementation, when determining a distribution status of the N first parameters in the at least one parameter value interval, the processor 601 is specifically configured to: determine that a quantity of first parameters that are in the N first parameters and that are corresponding to each parameter value interval is obtained.

In a possible implementation, when determining a distribution status of the N first parameters in the at least one parameter value interval, the processor 601 is specifically configured to: determine that a quantity of first parameters that are in the N first parameters and that are corresponding to each parameter value interval is obtained; and determine a ratio of the quantity of first parameters corresponding to each parameter value interval to N.

In a possible implementation, the information about the first parameter includes at least one of physical resource block usage and an air interface transmission rate.

In a possible implementation, when performing sampling in the N sampling periods, to obtain the information about the N first parameters, the processor 601 is specifically configured to: perform sampling in each sampling sub-period in a first sampling period, to obtain a quantity of physical resource blocks that are used for transmission and that are corresponding to each sampling sub-period, where the first sampling period is any one of the N sampling periods; and determine physical resource block usage corresponding to the first sampling period according to the formula (1) above.

In a possible implementation, when performing sampling in the N sampling periods, to obtain the information about the N first parameters, the processor 601 is specifically configured to: obtain, in a first sampling period, a data volume of each transmitted data packet and transmission duration of each data packet, where the first sampling period is any one of the N sampling periods; and determine an air interface transmission rate corresponding to the first sampling period according to the formula (2) above.

Figure 7:
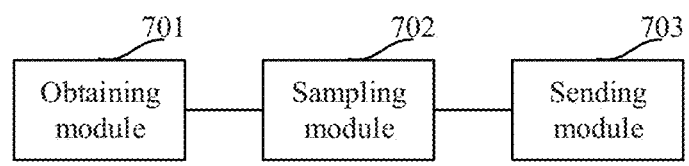
FIG. 7 is a first schematic structural diagram of another network device according to this application.

Based on a same technical concept, an embodiment of this application further provides a network device. The network device may be configured to implement the steps performed by the first network device in the foregoing method embodiment. FIG. 7 is a schematic structural diagram of a network device according to an embodiment of this application. As shown in the figure, the network device includes: an obtaining module 701, a sampling module 702, and a sending module 703.

Specifically, the obtaining module 701 is configured to obtain at least one of sampling information and reporting information, where the sampling information is used to indicate a sampling period, the reporting information is used to indicate a reporting period, the reporting period is N times the sampling period, and N is an integer greater than or equal to 1.

The sampling module 702 is configured to perform sampling in N sampling periods included in the reporting period, to obtain information about N first parameters, where N is an integer greater than or equal to 1.

The sending module 703 is configured to send the information about the N first parameters to a second network device.

In a possible implementation, at least one of the sampling information and the reporting information is sent by the second network device to the first network device. In a specific embodiment, the first network device may receive a measurement task sent by the second network device. The measurement task may include the information about the first parameter, the sampling information, and the reporting information. The first network device performs sampling and reporting on the first parameter based on the measurement task.

In a possible implementation, at least one of the sampling information and the reporting information is preset information. In a specific embodiment, the first network device performs sampling and reporting on the first parameter based on the sampling information and the reporting information that are pre-stored in a memory.

Figure 8:
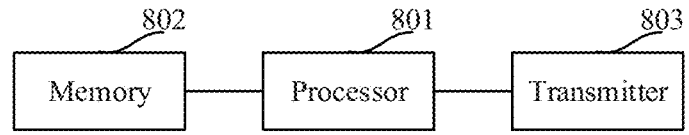
FIG. 8 is a second schematic structural diagram of another network device according to this application.

Based on a same technical concept, an embodiment of this application further provides a network device. The network device may be configured to implement the steps performed by the first network device in the foregoing method embodiment. FIG. 8 is a schematic structural diagram of a network device according to an embodiment of this application. As shown in the figure, the network device includes: a processor 801, and a memory 802 and a transmitter 803 that are separately connected to the processor 801.

The processor 801 is configured to invoke a computer program pre-stored in the memory 802 to: obtain at least one of sampling information and reporting information, where the sampling information is used to indicate a sampling period, the reporting information is used to indicate a reporting period, the reporting period is N times the sampling period, and N is an integer greater than or equal to 1; and perform sampling in N sampling periods included in the reporting period, to obtain information about N first parameters, where N is an integer greater than or equal 1; and the transmitter 803 is configured to send the information about the N first parameters to a second network device.

In a possible implementation, at least one of the sampling information and the reporting information is sent by the second network device to the first network device. In a specific embodiment, the first network device may receive a measurement task sent by the second network device. The measurement task may include the information about the first parameter, the sampling information, and the reporting information. The first network device performs sampling and reporting on the first parameter based on the measurement task.

In a possible implementation, at least one of the sampling information and the reporting information is preset information. In a specific embodiment, the first network device performs sampling and reporting on the first parameter based on the sampling information and the reporting information that are pre-stored in the memory.

An embodiment of this application further provides a computer-readable storage medium, and the computer-readable storage medium stores a computer instruction. When the instruction is run on a computer, the computer is enabled to perform the foregoing method embodiment.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims of this application and their equivalent technologies.

What is claimed is:

1. A method, comprising:
    obtaining, by a first network device, sampling information or reporting information, wherein the sampling information indicates a sampling period, the reporting information indicates a reporting period, the reporting period is N times the sampling period, and N is an integer greater than or equal to 1;
    performing, by the first network device, sampling in N sampling periods comprised in the reporting period, to obtain N first parameters;

for each parameter interval range of a plurality of parameter interval ranges, determine a quantity of first parameters of the N first parameters that fall within the respective parameter interval range, to determine a parameter distribution of the N first parameters; and sending, by the first network device, information about the parameter distribution of the N first parameters to a second network device.

2. The method according to claim 1, wherein the sampling information or the reporting information is sent by the second network device to the first network device.

3. The method according to claim 1, wherein the sampling information or the reporting information is preset.

4. The method according to claim 1, wherein obtaining, by the first network device, the sampling information or the reporting information comprises:
   obtaining, by the first network device, the sampling information.

5. The method according to claim 1, wherein obtaining, by the first network device, the sampling information or the reporting information comprises:
   obtaining, by the first network device, the reporting information.

6. The method according to claim 1, wherein obtaining, by the first network device, the sampling information or the reporting information comprises:
   obtaining, by the first network device, the sampling information and the reporting information.

7. A network device, wherein the network device is configured to be usable as a first network device, and the network device comprises:
   a processor;
   a non-transitory memory connected to the processor; and
   a transmitter connected to the processor;
   wherein the processor is configured to invoke a computer program stored in the memory to:
      obtain sampling information or reporting information, wherein the sampling information indicates a sampling period, the reporting information indicates a reporting period, the reporting period is N times the sampling period, and N is an integer greater than or equal to 1; and
      perform sampling in N sampling periods comprised in the reporting period, to obtain N first parameters;
      for each parameter interval range of a plurality of parameter interval ranges, determine a quantity of first parameters of the N first parameters that fall within the respective parameter interval range, to determine a parameter distribution of the N first parameters; and
   wherein the transmitter is configured to send information about the parameter distribution of the N first parameters to a second network device.

8. The network device according to claim 7, wherein the sampling information or the reporting information is sent by the second network device to the first network device.

9. The network device according to claim 7, wherein the sampling information or the reporting information is preset.

10. A network device, wherein the network device is configured to be usable as a first network device, and the network device comprises:
    a processor;
    a non-transitory memory connected to the processor; and
    a transmitter connected to the processor;
    wherein the processor is configured to invoke a computer program stored in the memory to:
       obtain sampling information, reporting information, or information about one or more preset parameter value intervals, wherein the sampling information indicates a sampling period, the reporting information indicates a reporting period, the reporting period is N times the sampling period, N is an integer greater than or equal to 1, and the information about the one or more preset parameter value intervals indicates, for each of the one or more preset parameter value intervals, a parameter value range corresponding to the respective parameter value interval;
       perform sampling in N sampling periods, to obtain N first parameters; and
       distribute the N first parameters into a plurality of parameter value intervals, to determine distribution status information of the N first parameters, the plurality of parameter value intervals including the one or more preset parameter value intervals; and
    wherein the transmitter is configured to send the distribution status information to a second network device.

11. The network device according to claim 10, wherein the sampling information, the reporting information, or the information about the one or more preset parameter value intervals is sent by the second network device to the first network device.

12. The network device according to claim 10, wherein the sampling information or the information about the one or more preset parameter value intervals is preset.

13. The network device according to claim 10, wherein the processor being configured to invoke the computer program stored in the memory to distribute the N first parameters into the plurality of parameter value intervals comprises the processor being configured to invoke the computer program stored in the memory to:
    determine a quantity of first parameters that are in the N first parameters and that correspond to a first parameter value interval of the plurality of parameter value intervals.

14. The network device according to claim 10, wherein the information about the one or more preset parameter value intervals indicates a parameter value range corresponding to a respective parameter value interval for each parameter value interval of the one or more parameter value intervals, and the processor being configured to invoke the computer program stored in the memory to distribute the N first parameters into the plurality of parameter value intervals comprises the processor being configured to invoke the computer program stored in the memory to:
    for each parameter value interval of the plurality of parameter value intervals:
       determine a quantity of first parameters that are in the N first parameters and that correspond to the respective parameter value interval; and
       determine a ratio of the quantity of first parameters corresponding to the respective parameter value interval to N.

15. The network device according to claim 10, wherein the each of the N first parameters comprises a physical resource block usage or an air interface transmission rate.

16. The network device according to claim 10, wherein the processor being configured to invoke the computer program stored in the memory to perform sampling in the N sampling periods, to obtain the N first parameters, comprises the processor being configured to invoke the computer program stored in the memory to:
    perform sampling in each sampling sub-period in a first sampling period, to obtain a quantity of physical resource blocks that are used for transmission and that correspond to each sampling sub-period, wherein the first sampling period is any one of the N sampling periods; and determine physical resource block usage corresponding to the first sampling period according to the following relation:

$$M = \left\lfloor \frac{M1}{P} * 100 \right\rfloor$$

wherein M indicates the physical resource block usage corresponding to the first sampling period, M1 indicates a quantity of physical resource blocks used for transmission, and P indicates a quantity of physical resource blocks usable for transmission.

17. The network device according to claim 10, wherein the processor being configured to invoke the computer program stored in the memory to perform sampling in the N sampling periods, to obtain the N first parameters, comprises the processor being configured to invoke the computer program stored in the memory to:

obtain, in a first sampling period, a data volume of each transmitted data packet and transmission duration of each data packet, wherein the first sampling period is any one of the N sampling periods; and determine an air interface transmission rate corresponding to the first sampling period according to the following relation:

$$IPthroughput = \frac{\sum_{i=1}^{L} ThpVolDl(i)}{\sum_{i=0}^{L} ThpTimeDl(i)}$$

wherein Ipthroughput indicates the air interface transmission rate, L indicates that L data packets are transmitted in the first sampling period, ThpVolDl(i) indicates a data volume of an $i^{th}$ transmitted data packet, ThpTimeDl(i) indicates transmission duration of the $i^{th}$ data packet, and i is an integer greater than or equal to 1 and less than or equal to L.

18. The network device according to claim 10, wherein the processor being configured to invoke the computer program stored in the memory to obtain the sampling information, the reporting information, or the information about the one or more preset parameter value intervals comprises the processor being configured to invoke the computer program stored in the memory to:

obtain the sampling information, the reporting information, and the information about the one or more preset parameter value intervals.

19. The network device according to claim 10, wherein the processor being configured to invoke the computer program stored in the memory to obtain the sampling information, the reporting information, or the information about the one or more preset parameter value intervals comprises the processor being configured to invoke the computer program stored in the memory to:

obtain the sampling information and the information about the one or more preset parameter value intervals.

20. The network device according to claim 10, wherein the processor being configured to invoke the computer program stored in the memory to obtain the sampling information, the reporting information, or the information about the one or more preset parameter value intervals comprises the processor being configured to invoke the computer program stored in the memory to:

obtain the reporting information and the information about the preset parameter one or more preset parameter value intervals.

* * * * *